(12) United States Patent
Takeuchi et al.

(10) Patent No.: US 9,046,611 B2
(45) Date of Patent: Jun. 2, 2015

(54) SELF-POWERED GAMMA DETECTOR

(71) Applicants: JAPAN ATOMIC ENERGY AGENCY, Ibaraki (JP); SUKEGAWA ELECTRIC CO., LTD., Ibaraki (JP)

(72) Inventors: Tomoaki Takeuchi, Higashi-ibaraki (JP); Hiroshi Nagata, Higashi-ibaraki (JP); Noriaki Ohtsuka, Higashi-ibaraki (JP); Akira Shibata, Higashi-ibaraki (JP); Kunihiko Tsuchiya, Higashi-ibaraki (JP); Kuniaki Miura, Takahagi (JP); Hiroshi Yamamoto, Naka (JP)

(73) Assignees: Japan Atomic Energy Agency, Ibaraki (JP); Sukegawa Electric Co., Ltd., Ibaraki (JP)

( * ) Notice: Subject to any disclaimer, the term of this patent is extended or adjusted under 35 U.S.C. 154(b) by 182 days.

(21) Appl. No.: 14/051,674

(22) Filed: Oct. 11, 2013

(65) Prior Publication Data
US 2014/0110578 A1    Apr. 24, 2014

(30) Foreign Application Priority Data
Oct. 19, 2012    (JP) .................................. 2012-231499

(51) Int. Cl.
*G01T 1/17*    (2006.01)
*G01T 3/00*    (2006.01)

(52) U.S. Cl.
CPC ...................................... *G01T 3/006* (2013.01)

(58) Field of Classification Search
CPC ........................................................ G01T 3/006
USPC ........................................................ 250/336.1
See application file for complete search history.

(56) References Cited

U.S. PATENT DOCUMENTS

| 3,787,697 A | * | 1/1974 | Shields | 250/370.04 |
| 4,238,676 A | * | 12/1980 | Goldstein et al. | 250/370.04 |
| 4,363,970 A | * | 12/1982 | Allan et al. | 250/390.01 |

FOREIGN PATENT DOCUMENTS

| JP | 2006-208160 A | 8/2006 |
| JP | 2007-285990 A | 11/2007 |

* cited by examiner

*Primary Examiner* — David Porta
*Assistant Examiner* — Hugh H Maupin
(74) *Attorney, Agent, or Firm* — Brundidge & Stanger, P.C.

(57) ABSTRACT

A self-powered gamma detector which can hold the influence of neutron rays to the minimum, and can measure the dose of gamma rays accurately under a high neutron environment in the reactor is disclosed. The self-powered gamma detector has a columnar emitter member; a collector member arranged in surroundings of the emitter member through an insulating member, and the strength of gamma rays is measured by detecting the value of a current which flows between the emitter member and an MI cable connected with the emitter member, and the collector member. Especially, the emitter member consists of pure tungsten (W), whose inevitable impurities is in 0.03 percent by weight or less.

10 Claims, 4 Drawing Sheets

(A)

(B)

SELF-POWERED GAMMA DETECTOR

BACKGROUND OF THE INVENTION

The present invention relates to a self-powered gamma detector which can hold the influence of neutron rays to the minimum, and can measure the dose of gamma rays accurately under a high neutron environment in the reactor etc. Here, "self-powered detector" means that neither an internal power supply nor an external power supply are needed, and the detector itself can give the power output due to the incidence of gamma rays to the detector.

As a self-powered in-core gamma detector (hereafter, referred to as SPGD) which is used in a nuclear reactor, a γ thermometer has been developed to date. In the γ thermometer, the temperature of the iron etc. installed in a small vacuum-insulated space is raised by the γ heat generation. It is, therefore, possible to obtain the strength of the gamma ray by measuring the temperature rise by using a thermocouple. For instance, a reactor power monitoring system comprising a local monitoring system using a self-powered detector and a gamma thermometer for calibration is disclosed in JP 2007-285990 A. The monitoring system disclosed here is used to observe the reactor power overall. The gamma thermometer for calibration is composed so as to measure the heat generation temperature by a differential thermocouple by using the heat generation phenomenon in the stainless steel caused by gamma rays, and to measure the gamma ray output distribution.

Moreover, there is a neutron detector described in JP 2006-0208160 A as the in-core detector which has a similar structure to the present invention though it is the detector not for gamma rays but neutron rays. In this neutron detector, electrons generated due to the nuclear reaction caused when a thermal neutron ray is incident on the emitter member move from a columnar emitter to a collector, the electric current caused by the movement of the electrons is measured by an ammeter through a MI (Mineral Insulated) cable, and thermal neutron flux is measured from the current value obtained.

BRIEF SUMMARY OF THE INVENTION

However, the gamma ray detector to measure the gamma ray output distribution shown in the reactor power monitoring system of JP 2007-285990 A had problems in that the response is not good, and it is subject to the irradiation effect by the neutrons.

Moreover, it is nothing but a neutron detector, and it has not the best structure to detect the gamma ray though "self-powered neutron detector" of JP 2006-0208160 A is of a self-powered type as well as the present invention.

The self-powered gamma detector in which it is good in the response as the gamma ray detector, the influence of the neutron irradiation can be controlled to the minimum, and it is, therefore, possible to measure accurately is sought. For instance, to examine the influence on the irradiation effect of the strength of the gamma ray to the internal structure, the self-powered gamma detector which can measure the strength of gamma rays of $10^6$ Gy/h or more in high accuracy under a high neutron flux environment of about $\phi_f$:$10^{11}$ n/m$^2$/s and $\phi_{th}$:$10^{18}$ n/m$^2$/s is sought.

Therefore, an object of the present invention is to provide a self-powered gamma detector which can measure the strength of the gamma ray with a high degree of accuracy, which can hold the influence of neutron ray to the minimum even in a high neutron flux environment and which can operate stably even at high temperatures.

It is necessary to measure the strength of gamma rays accurately in order to examine the influence on the irradiation effect of the reactor core internal structure by the strength of gamma rays. And, to measure the strength of gamma rays accurately as explained in the above section, the following performances are required.

(1) To operate stably from low temperatures to high temperatures.
(2) To hold the influence of neutron rays in the reactor to the minimum.
(3) To have an excellent response to the gamma ray as well as the linearity of the I/O characteristic.

The inventors selected the emitter member for the detector from the following viewpoints to operate stably even under high temperatures.

First of all, we focus on a high atomic number material with a comparatively high melting point, and select the material with a small neutron activation cross section in order to hold the influence of neutron rays to the minimum even in a high neutron environment. Finally, we confirmed the power output receptivity and the response of the selected material to gamma rays by experiment, and adopted it as an emitter member. And, the material which contains lead (Pb) as a major ingredient for measurement at low temperatures was selected and the material which contains tungsten (W) as a major ingredient for the measurement at low temperatures to high temperatures was selected.

Moreover, it was clarified that the output values to the strength of gamma rays show linearity under the following conditions in the gamma ray irradiation examination carried out by bringing the developed SPGD into cobalt (Co) irradiation facilities. That is, the sensitivity of SPGD for Pb emitter shows linearity in $10^2$ Gy/h or more, and the sensitivity of SPGD for W emitter shows linearity in $10^3$ Gy/h or more.

Concretely, the self-powered gamma detector (SPGD) according one aspect of the present invention has a columnar emitter member and a collector member arranged in surroundings of said emitter member through an insulating member. The strength of gamma rays is measured by detecting the value of a current which flows between said emitter member and an MI cable connected with said emitter member, and said collector member. Here, said emitter member consists of pure tungsten (W), whose inevitable impurities is in 0.03 percent by weight or less.

Because the material of a columnar emitter member of the present invention has been optimized from various viewpoints to the gamma ray detection, it is possible to obtain a self-powered gamma detector of a high sensitivity and an excellent response, which can measure gamma rays with a high degree of accuracy.

BRIEF DESCRIPTION OF SEVERAL DRAWINGS

DETAILED DESCRIPTION OF THE PREFERRED EMBODIMENT

Figure 1A:
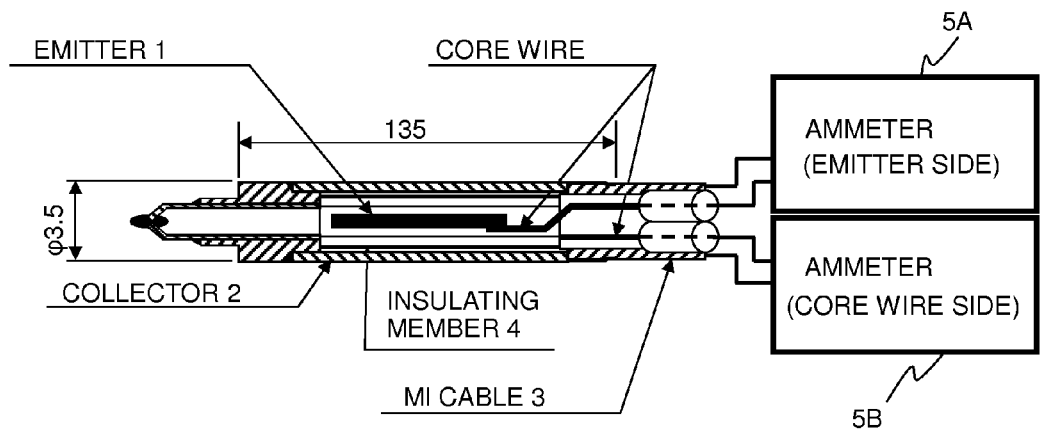
FIG. 1A is a schematic view showing the whole of a self-powered gamma detector according to the present invention.
Figure 1B:
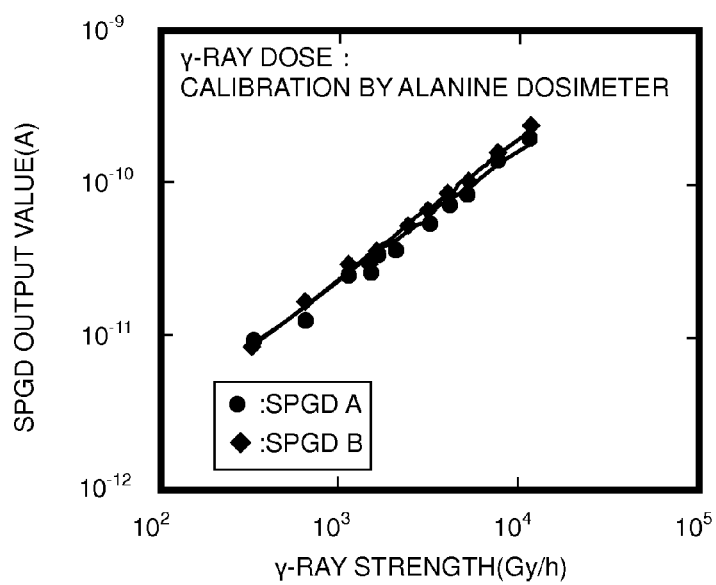
FIG. 1B is a principle explanatory view showing the result of the irradiation examination of using Co-60 radiation source.

The general configuration of the self-powered gamma detector (Hereinafter, referred to as SPGD) according to the present invention is shown in FIG. 1A. Referring to FIG. 1A, columnar emitter 1 is installed at the center of the cylindrical SPGD. When gamma rays are incident on emitter 1, electrons are released from emitter 1 by Compton scattering, and collected to cylinder collector 2 provided around emitter 1. As a result, an electric current flows. This electric current is led to external ammeter 5A through MI cable 3 to obtain the strength of the gamma rays. The strength of the gamma rays will be obtained from the output current value measured by the ammeter 5A in the following manner.

The strength of gamma rays and the output current values are linearly related in principle of SPGD. Therefore, by arranging SPGD at the position where the strength of gamma rays has been obtained in advance by using the alanine dosimeter etc., and measuring output current values (See FIG. 2), a general conversion factor from the output values to the strength of gamma rays is obtained for SPGD.

In one example of the present invention (See FIG. 1A), only the electric current generated between the collector of the sheath and the emitter member can be obtained by subtracting an output current due to the Compton electrons of the gamma rays generated between the core wire of the MI cable and the collector of the sheath from all electric currents due to the Compton electrons of the gamma rays generated from the core wire connected with the emitter member. Here, only the one-sided core wire of two core wires in the MI cable, which are comprised of the same material, was assumed to be in a non-connected state to the emitter. In this case, "the net SPGD output current" is obtained as "an output current (measurement value of ammeter A) from the emitter connection side" minus "output current (measurement value of ammeter B) only from the core wire of the MI cable". Accordingly, the influence of the gamma rays on the core wire of the MI cable can be checked, if necessary.

Figure 2:
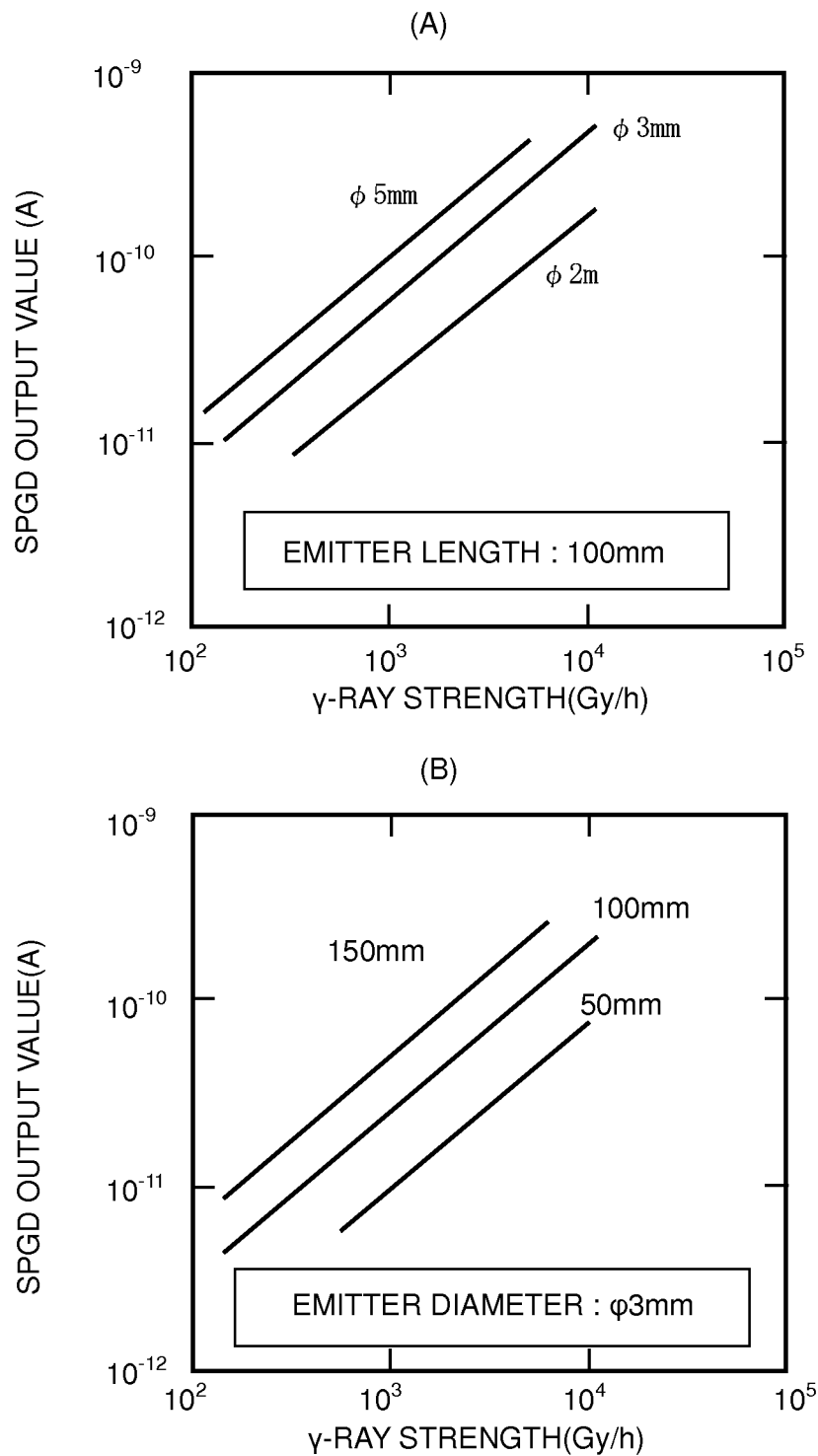
FIG. 2 is an explanatory view showing the shape dependence of a Pb emitter type self-powered gamma detector for low temperatures.
Figure 3:
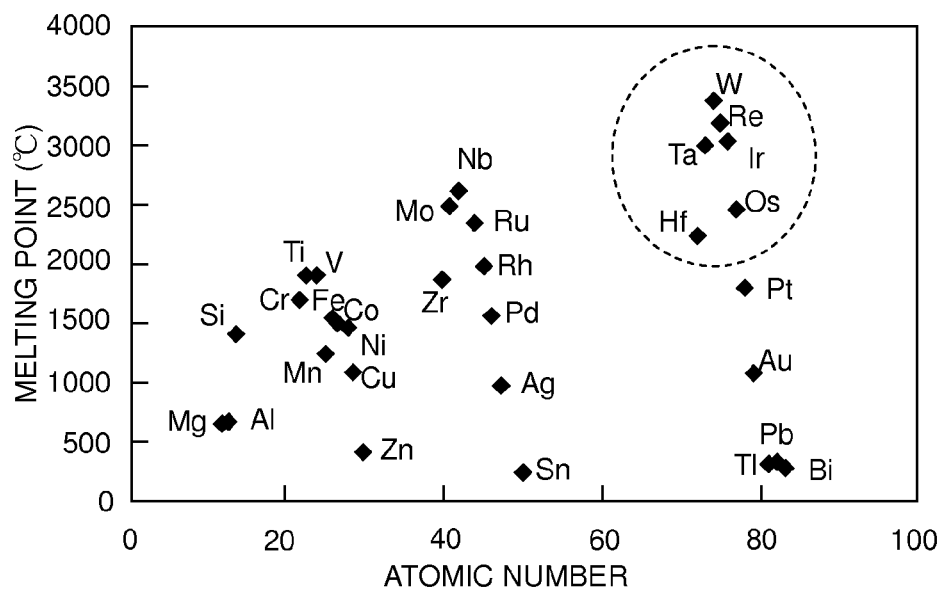
FIG. 3 is an explanatory view of the selection standard of metallic elements of an emitter member.
Figure 3:
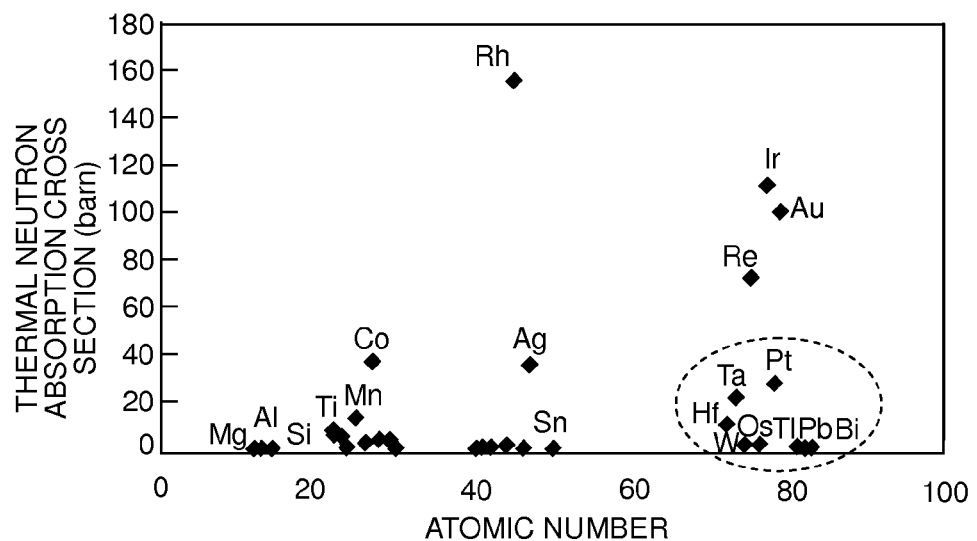
Figure 4:
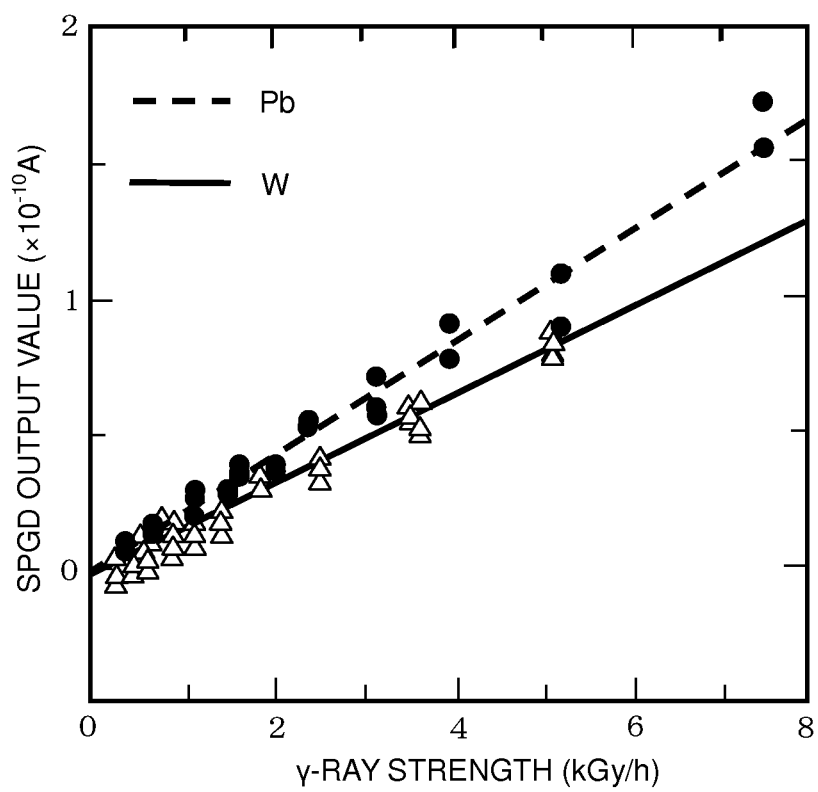
FIG. 4 is a power output calibration curve of self-powered gamma detectors for low temperatures and for low high temperatures.

Referring to FIG. 2-FIG. 4, examples of materials for an emitter used in each of a self-powered gamma detector for low temperatures and a self-powered gamma detector for low temperatures to high temperatures will be explained.

1. Pb Emitter Type SPGD For Low Temperatures

It is clarified that lead (Pb) having the high atomic number, of which the neutron activation cross section is small, can be preferable as a material for an emitter in high neutron environments.

Now, there is a problem that a caulking portion works loose at high temperatures (125° C. or more) when the lead side of the emitter is caulked with a lead wire, if lead with a very large coefficient of thermal expansion ($29.1 \times 10^{-5}$/° C.) is used. A manufacturing method of jointing reliably with the MI cable core wire (Ni($13.3 \times 10^{-6}$/° C.) or Cu ($17.1 \times 10^{-6}$/° C.)) was examined in view of the feature of flexible and adhesive emitter material to solve the above-mentioned problem. As a result, the manufacture of SPGD became possible. It is preferable to use Ni which does not rust easily as a core wire of the MI cable.

As described above, the material used as the above-mentioned emitter member of SPGD for low temperatures consists of Pb as a major ingredient, and unavoidable impurities.

The irradiation examination was carried out by bringing the developed SPGD into the Co irradiation facilities. As a result, the sensitivity of SPGD developed was in the range of $10^2$ Gy/h or more, and the output values to strength of the gamma rays exhibited linear characteristic.

Moreover, the shape dependence of the Pb emitter member (the relationship between the strength of gamma rays according to the shape of the emitter and the SPGD output values) is examined as shown in FIG. 2, and the sensitivity to the gamma rays of SPGD which depends on the shape of the emitter member was clarified. (A) of FIG. 2 shows the result of examining how the output value of SPGD changes when the length of the emitter member is assumed to be fixed-length of 100 mm, and the diameter $\phi$ is changed. And, (B) of FIG. 2 shows the result of examining how the output value of SPGD changes when the diameter of the emitter member is assumed to be constant $\phi$3 mm, and the length is changed. The shape dependence when length is constant is understood from (A) of FIG. 2, in which the output value of SPGD increases as the diameter of the emitter member increases from $\phi$2 mm to $\phi$3 mm and $\phi$5 mm. Moreover, it is understood from (B) of FIG. 2 that the output value of SPGD increases as the length of the emitter member becomes long when the diameter is constant. Therefore, it is desirable to make the diameter larger and to make the length longer within an acceptable range.

In the present invention, the material selection condition necessary to manufacture SPGD for low temperatures is as follows.

(1) Emitter Material

The neutron capture cross section of Pb is about 0.15 b (barn:$10^{-28}$ m$^2$). On the other hand, the (n, $\gamma$) reaction of cobalt (Co) is the neutron capture cross section of 37b, and the electric current output of cobalt SPGD having a shape similar to the SPGD for low temperatures is estimated to $2.5 \times 10^{-22}$ A/cm/nv. Therefore, the electric current output by the (n,$\gamma$) reaction of lead can be evaluated as about $1 \times 10^{-10}$ A/cm in $10^6$ Gy/h (In JMTR, the strength of gamma rays is $10^6$ Gy/h or more in $\phi$f:$10^{18}$ n/m$^2$/s and $\phi$th:$10^{18}$ n/m$^2$/s). In addition, the output current of SPGD for low temperatures which flows by the Compton scattering of the gamma rays is about $10^{-11}$ A/cm at $10^4$ Gy/h of the strength of gamma rays. Therefore, the influence of the electric current output caused by the reaction with the thermal neutron to all electric current output is estimated to only about 10%. Therefore, it has no impact on the measurement.

(2) Collector Material:

SUS316L and NCF600 are useful for a collector material. However, SUS316L is selected from the viewpoint of the productivity because the use temperature of the SPGD for low temperatures is 200° C. or less.

(3) Insulating Material $Al_2O_3$ and MgO are useful for an insulating material of the detecting part. It is preferable to use $Al_2O_3$ from the viewpoint of the shaping of the insulating material, especially to use high grade $Al_2O_3$ to decrease the influence of radiation inducement electromotive force.

2. Tungsten Emitter Type SPGD for Low Temperatures to High Temperatures

In the development of the SPGD which can use in the measurement from low temperatures to high temperatures, the emitter material was selected based on the relationship among the atomic number, the melting point, and the absorption cross section of thermal neutrons (See FIG. 3).

As a result, tungsten (W), hafnium (Hf), tantalum (Ta), osmium (Os), and their alloys were selected. Because these materials are hard differently from Pb used in the Pb emitter type SPGD for low temperatures and friable, it is difficult to caulk. In addition, it is difficult to weld because of high melting point. Therefore, the joint technique to braze appropriately the MI cable core wire (Ni or Cu) with the Ni coating for ensuring the wettability of brazing filler at brazing has been developed. Here, It is preferable to use Ni which does not rust easily as a core wire of the MI cable. As a result of development, it was clarified that in tungsten (W), the output value to the strength of gamma rays shows linearity though its output value decreases by 30% compared with Pb emitter type SPGD for low temperatures. In addition, the Ni-based brazing filler gave the prospect for heat resistant temperature of 600° C. or more.

Tungsten (W) has been selected as an emitter material in one embodiment of the present invention as seen also from FIG. 4 shown hereafter, And, the component of tungsten (W) adopted here is as follows.

Fe:0.002 wt %, Mo:0.002 wt %, Al:<0.0005 wt %, Si:<0.0010 wt %, Ca:<0.0003 wt %, Mg:<0.0003 wt %.

The characteristic comparison between SPGD for low temperatures and SPGD for low and high temperatures is shown in FIG. 4. It was clarified to be possible up to 600° C. of the application limit temperature of the brazing filler, and to be able to use for the irradiation examination at high temperatures from the result of the characteristic comparison though the power output due to the strength of gamma rays of SPGD for low and high temperatures was lower than SPGD for low temperatures. The material selection condition required to manufacture SPGD for low and high temperatures is as follows according to these findings.

(1) Emitter Material

Tungsten (W), hafnium (Hf), tantalum (Ta), and osmium (Os) are elements which can secure an enough emission electric current by wire because the atomic numbers of these elements are large though do not reach lead. In addition, the melting points of these elements are very high and they are in the range of about 2,222° C. to 3,400° C., which are different from lead. Therefore, they are expected as SPGD which can be used in a high temperature condition. The neutron capture cross section of each of tungsten (W), hafnium (Hf), tantalum (Ta), and osmium (Os) is 18b, 10b, 21b, and 1.6b, and a countermeasure which calculate the noise electric current due to the (n, γ) reaction from an amount of neutrons and remove it are devised.

(2) Collector Material

In the characteristic required for the collector material, the material property at high temperatures should be excellent, which differs from SPGD for low temperatures. Therefore, it is preferable to use NCF600 of which maximum usable temperature is high, which is selected from Table 1 showing the characteristic comparison between SUS316L and NCF600 as the collector material.

TABLE 1

|  | SUS316L | NCF600 |
|---|---|---|
| Maximum usable temperature | 500° C. | 800° C. |
| Corrosion resistance | Good | Good |
| Oxidation property | Good | Excellent |
| Thermal electromotive force | Excellent | Good |
| Cost | Low | High |
| Manufacturing | Excellent | Good |

(3) Insulating Material $Al_2O_3$ and MgO are useful for an insulating material of the detecting part. It is preferable to use $Al_2O_3$ from the viewpoint of the shaping of the insulating material, especially to use high grade $Al_2O_3$ to decrease the influence of radiation inducement electromotive force. High-insulating ruby is better than high grade $Al_2O_3$ for high temperatures of 600° C. to 800° C.

The manufacture of SPGD was enabled by examining the bondability of the selected emitter material and a MI cable core wire, and selecting the best joint method to the emitter member.

Concretely, a reliable joint was obtained by making Pb or alloys containing Pb put on the surface of Ni and Ni alloy lead member or coating so that caulked portion should not loosen at high temperatures because a lead (Pb) emitter for low temperatures has a coefficient of thermal expansion higher than that of lead wire, and by caulking and Pb brazing afterwards.

Because tungsten (W) emitter which can measure continuously is hard and friable, it is difficult to caulk. In addition, it is difficult to weld because of high melting point. A reliable joint was obtained by applying brazed joint which was suitable for the working temperature after applying or coating nickel (Ni) or alloys containing Ni to the surface of the lead installation side of W emitter (also to the inner surface of a hole when the hole is provided). The above-mentioned result found that It is possible to manufacture a reliable self-powered gamma detector by using ruby as the insulating material and Ni system brazing filler when heatproof exceeds 600° C.

What is claimed is:

1. A self-powered gamma detector comprising:
    a solid columnar emitter member;
    a collector member surrounding said emitter member through an insulating member;
    the strength of gamma rays being measured by detecting the value of a current which flows between said emitter member and an MI cable connected with said emitter member, and said collector member;
    wherein said emitter member consists of pure tungsten (W), whose inevitable impurities is in 0.03 percent by weight or less.

2. The self-powered gamma detector according to claim 1, wherein said collector member is composed of NCF600.

3. The self-powered gamma detector according to claim 1, wherein said insulating member is composed of ruby.

4. The self-powered gamma detector according to claim 2, wherein said insulating member is composed of ruby.

5. The self-powered gamma detector according to claim 1, wherein said MI cable core wire is comprised of nickel (Ni) or copper (Cu), and Connected part of said emitter member and said MI cable core wire is both coated with Ni or Ni-based alloys.

6. The self-powered gamma detector according to claim 2, wherein said MI cable core wire is comprised of nickel (Ni) or copper (Cu), and Connected part of said emitter member and said MI cable core wire is both coated with Ni or Ni-based alloys.

7. The self-powered gamma detector according to claim 3, wherein said MI cable core wire is comprised of nickel (Ni) or copper (Cu), and a connected part of said emitter member and said MI cable core wire is coated with Ni or Ni-based alloys.

8. The self-powered gamma detector according to claim 1, further comprising:
    a second MI cable composed of the same material as said MI cable, which is not connected with said MI cable; and
    an current detector which detects a second current flowing between said second MI cable and said collector member;
    wherein said power output of said self-powered gamma detector is derived based on the value obtained by subtracting a value of said second current from the value of said first current which flows between the MI cable connected with said emitter member and said emitter member, and said collector member.

9. The self-powered gamma detector according to claim 2, further comprising:
a second MI cable composed of the same material as said MI cable, which is not connected with said MI cable; and
an current detector which detects a second current flowing between said second MI cable and said collector member;
wherein said power output of said self-powered gamma detector is derived based on the value obtained by subtracting a value of said second current from the value of said first current which flows between the MI cable connected with said emitter member and said emitter member, and said collector member.

10. The self-powered gamma detector according to claim 3, further comprising:
a second MI cable composed of the same material as said MI cable, which is not connected with said MI cable; and
an current detector which detects a second current flowing between said second MI cable and said collector member;
wherein said power output of said self-powered gamma detector is derived based on the value obtained by subtracting a value of said second current from the value of said first current which flows between the MI cable connected with said emitter member and said emitter member, and said collector member.

\* \* \* \* \*